United States Patent
Sheffield et al.

(10) Patent No.: US 8,675,299 B2
(45) Date of Patent: Mar. 18, 2014

(54) HEAD RADIAL POSITIONING OVER CONTACT-START-STOP ZONE DURING SPIN-UP/SPIN-DOWN OF DISK

(75) Inventors: Mark Edward Sheffield, Northborough, MA (US); Philip John Bartels, Lexington, MA (US); Geoffrey Wayne Kaiser, Westborough, MA (US); James Fay Martin, Westborough, MA (US); Seshadri Ramaswamy, Lexington, MA (US)

(73) Assignee: Seagate Technology LLC, Cupertion, CA (US)

( * ) Notice: Subject to any disclaimer, the term of this patent is extended or adjusted under 35 U.S.C. 154(b) by 42 days.

(21) Appl. No.: 12/434,900

(22) Filed: May 4, 2009

(65) Prior Publication Data

US 2010/0277826 A1    Nov. 4, 2010

(51) Int. Cl.
*G11B 21/02*    (2006.01)
(52) U.S. Cl.
USPC ............................................................. 360/75

(58) Field of Classification Search
None
See application file for complete search history.

(56) References Cited

U.S. PATENT DOCUMENTS

| | | | |
|---|---|---|---|
| 5,729,399 A * | 3/1998 | Albrecht et al. | 360/75 |
| 5,798,884 A * | 8/1998 | Gillis et al. | 360/75 |
| 5,825,575 A * | 10/1998 | Lee | 360/75 |
| 5,953,178 A * | 9/1999 | Takatsuka et al. | 360/77.02 |
| 6,381,090 B1 | 4/2002 | Suzuki et al. | |
| 6,798,603 B1 * | 9/2004 | Singh et al. | 360/73.03 |
| 6,850,382 B2 * | 2/2005 | Fayeulle et al. | 360/75 |
| 6,882,495 B2 * | 4/2005 | Duvall et al. | 360/75 |
| 6,903,902 B1 | 6/2005 | Hiller | |
| 7,158,328 B2 | 1/2007 | Fayeulle | |
| 7,301,726 B1 | 11/2007 | Suzuki | |
| 2008/0019053 A1 | 1/2008 | Liu et al. | |

* cited by examiner

Primary Examiner — Andrew L Sniezek
(74) Attorney, Agent, or Firm — HolzerIPLaw, PC (57) ABSTRACT

A read/write head is moved across a contact-start-stop (CSS) zone on a data storage disk during the spin-up and/or spin-down of the disk. Moving the head during spin-up and/or spin-down may reduce the concentration of wear along a surface of the CSS zone.

22 Claims, 5 Drawing Sheets

HEAD RADIAL POSITIONING OVER CONTACT-START-STOP ZONE DURING SPIN-UP/SPIN-DOWN OF DISK

FIELD OF THE INVENTION

The present invention generally relates to data storage devices and, more particularly, to controlling positioning of a head relative to a data storage disk.

BACKGROUND OF THE INVENTION

Hard disk drives include one or more rigid disks that are coated with a magnetizable medium and mounted on a spindle hub of a spin motor for rotation at a high speed. Information is read from and written to each disk on a plurality of concentric tracks by a read/write head ("head") mounted on an actuator arm. The outside circumference of each disk is referred to as the "outer diameter" (OD), and the center of each disk is referred to as the "inner diameter" (ID). A head is said to "fly" over the disk surface on an air bearing as the disk rotates. When disk rotational velocity decreases, the layer of air supporting the read/write head above the disk surface diminishes and the head descends toward the disk surface. Contact between the head and the disk surface can damage the magnetizable medium and the head. Furthermore, through a phenomenon called "stiction," a head can become permanently or temporarily "stuck" to the disk surface after landing on the disk surface. Stiction can damage the magnetizable medium, the head, and/or the actuator arm when the disk drive system initiates disk rotation in an attempt to move the read/write head from the disk surface.

A contact-start-stop (CSS) configuration may be used to address this problem. A CSS configured disk drive responds to spin-down of a disk by moving a head over a CSS zone defined on the disk so that the read/write head lands on the CSS zone as the disk loses rotational velocity and lands thereon. The disk drive responds to spin-up of the disk by moving the head from the CSS zone back to data areas on the disk when the disk rotational velocity becomes sufficient to allow the head to fly above the disk surface.

The CSS zone should have a sufficient length and width to accommodate landing of the head thereon during spin-down of the disk and to accommodate the lift of the head off therefrom during spin-up of the disk. The CSS zone can have a textured surface that reduces contact area between the head and the CSS zone to avoid stiction.

SUMMARY OF THE INVENTION

A read/write head is moved across a CSS zone on a data storage disk during the spin-up and/or spin-down of the disk. Moving the head during spin-up and/or spin-down may reduce the concentration of wear along a surface of the CSS zone.

In some embodiments, a circuit includes a controller circuit that controls an actuator motor to move a head radially across a CSS zone, which is defined between inner and outer CSS diameter locations on a data storage disk, during spin-up and/or spin-down of the disk.

In some other embodiments, an electronic circuit is operated to respond to spin-up and/or spin-down of a data storage disk by moving a head radially across a CSS zone.

In some other embodiments, the CSS zone has a greater average surface roughness than data storage surface regions of the disk. An actuator motor positions a head relative to the data storage disk responsive to actuator current. A controller circuit operates during spin-up of the disk drive to increase the actuator current to move the head toward the inner CSS diameter location on the disk. During spin-down of the disk the controller circuit does not operate to increase the actuator current so that the head can move toward the outer CSS diameter location on the disk responsive to frictional force on the head as the disk spins-down

DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/"includes any and all combinations of one or more of the associated listed items. In the drawings, the size and relative sizes of regions may be exaggerated for clarity. Like numbers refer to like elements throughout.

It will be understood that, although the terms first, second, etc. may be used herein to describe various elements, these elements should not be limited by these terms. These terms are only used to distinguish one element from another. For example, a first region/element/value could be termed a second region/element/value, and, similarly, a second region/element/value could be termed a first region/element/value without departing from the teachings of the disclosure.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium that is executable by a processor to perform functionality described herein. Accordingly, as used herein, the terms "circuit" and "module" may take the form of digital circuitry, such as computer-readable program code executed by a processor (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of disk drives for purposes of illustration and explanation only, the present invention is not limited thereto. It is to be understood that the present invention can be more broadly used for any type of servo control loop that positions a head relative to a CSS zone on a disk while the head is prepared for landing-on the CSS zone as the disk spins-down and/or for lifting-off the CSS zone as the disk spins-up.

Some embodiments may arise from the present realization that the reliability of disk drives can be substantially affected by the wearing away of critical operational layers of a head by contact with a CSS zone over the tremendous number of CSS cycles that occur in typical disk drives, such as over 100,000 CSS cycles during the expected life of some portable computer applications. The CSS zone typically has a lubrication layer to reduce head wear, however, the lubrication layer can be worn away by the repetitive CSS cycles and eventually result in undesirable contact between the head and non-lubricated surface of the CSS zone.

It has been further realized that although the CSS zone typically has a much greater radial width than the head to accommodate a range of motion of the head while latched over the CSS zone, when the disk is rotating the head predominately contacts the CSS zone along a narrow path along an outer diameter radial location of the CSS zone. In particular, while the disk is rotating, the head is subjected to a frictional force vector (e.g., due to contact with the rotating CSS zone surface and windage) that has a circumferential component in a direction of disk rotation and a radial component in a direction toward the outer diameter of the CSS zone. Consequently, during spin-up and spin-down of the disk the head is forced to the outer diameter of the CSS zone which causes a concentrated wearing away of the lubricant along that narrow contact pathway. Thus, the lubricant on the CSS zone is predominantly worn away along the outer diameter of the CSS zone. Some embodiments of the present invention may reduce the concentration of wear along any particular portion of the CSS zone by radially moving the head across the CSS zone during spin-up and/or spin-down of the disk so as to spread-out the contact area and associated wear over a larger surface of the CSS zone.

Figure 1:
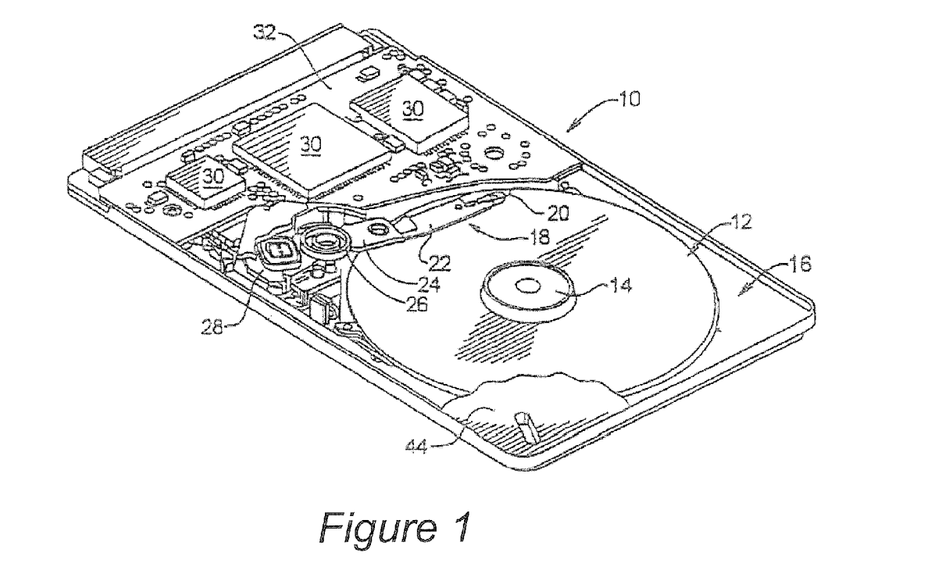
FIG. 1 illustrates a perspective view of a disk drive with electronic circuits that are configured in accordance with some embodiments of the present invention.

A simplified diagrammatic representation of a disk drive, generally designated as 10, is illustrated in FIG. 1. The disk drive 10 includes a disk stack 12 (illustrated as a single disk) that is rotated by a spin motor 14. The spin motor 14 is mounted to a base plate 16. An actuator arm assembly 18 is also mounted to the base plate 16. The disk drive 10 is configured to store and retrieve data responsive to write and read commands from a host. A host can include, but is not limited to, a desktop computer, a laptop computer, a personal digital assistant (PDA), a digital video recorder/player, a digital music recorder/player, and/or another electronic device that can be communicatively coupled to store and retrieve data in the disk drive 10.

The actuator arm assembly 18 includes a head 20 (or transducer) mounted to a flexure arm 22 which is attached to an actuator arm 24 that can rotate about a pivot bearing assembly 26. The head 20 may, for example, comprise an magnetoresistive (MR) element and/or a thin film inductive (TFI) element. An actuator motor 28 (e.g., a voice coil motor (VCM)) rotates the actuator arm assembly 18 to radially move the head 20 relative to the disk stack 12. The spin motor 14 and actuator arm assembly 18 are coupled to a controller, read/write channel circuits, and other associated electronic circuits 30 which can be enclosed within one or more integrated circuit packages mounted to a printed circuit board (PCB) 32. The electronic circuits 30 may include analog and/or digital circuitry, and typically includes a digital signal processor (DSP), a microprocessor-based controller and a random access memory (RAM) device.

Figure 2:
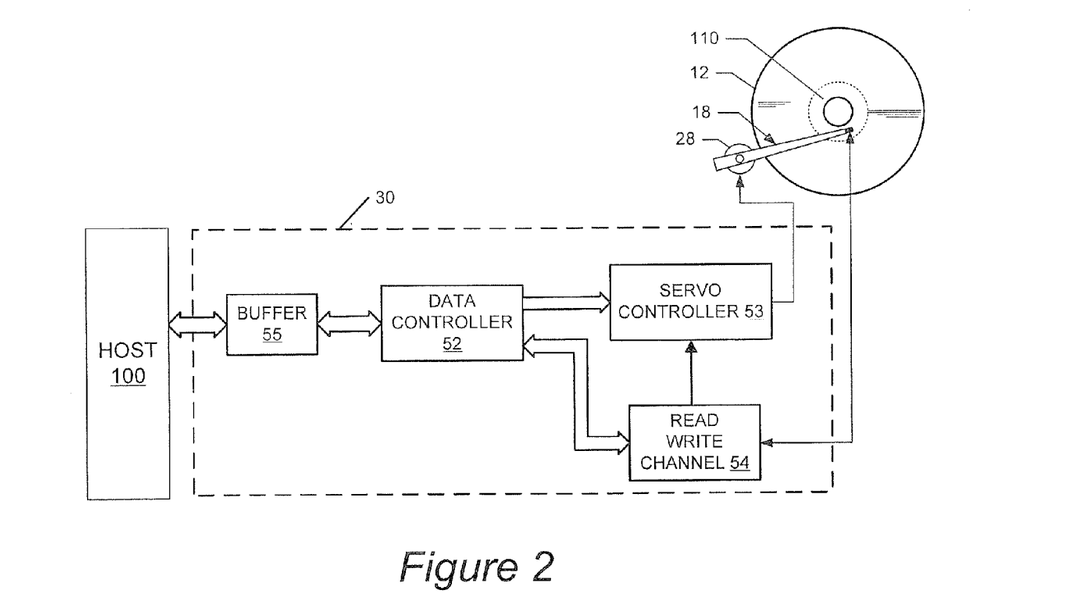
FIG. 2 illustrates a block diagram of a circuit that regulates positioning of a head over a CSS zone during spin-up and/or spin-down of a disk in accordance with some embodiments.

Referring to FIG. 2, the electronic circuits 30 can include a data controller 52, a servo controller 53, a read write channel 54, and a buffer 55. The exemplary embodiment of the electronic circuits 30 has been illustrated with two separate controllers 52,53, buffer 55, and a read write channel 54 for purposes of illustration and discussion only. It is to be understood that the functionality that is described herein for the controllers 52,53, buffer 55, and/or the read write channel 54 may be integrated within one integrated circuit package or distributed among more than one integrated circuit package.

Write commands and associated data from a host 100 are buffered in the buffer 55. The data controller 52 is configured to carry out buffered write commands by formatting the associated data into blocks with the appropriate header information, and to transfer the formatted data from the buffer 55, via the read/write channel 54, to LBAs on the disk 12 that are identified by the associated write command. The read write channel 54 can operate to convert data between the digital form used by the data controller 52 and the analog form conducted through the head 20 to/from the disk 12. The read write channel 54 provides servo positional information read from the disk 12 to the servo controller 53. The servo positional information can be used to detect the location of the head 20 in relation to LBAs on the disk 12. The servo controller 53 can use LBAs from the data controller 52 and the servo positional information to seek the head 20 to an addressed track and block on the disk 12, and to maintain the head 20 aligned with the track while data is written/read on the disk 12.

FIG. 2 also illustrates a CSS zone 110 that is defined along an inner diameter region of the disk 12, but which may instead of or additionally be defined along an outer diameter region or anywhere else on the disk 12 where data is not to be stored. The CSS zone 110 can have a greater average surface roughness than data storage surface regions of the disk. The CSS zone 110 may be formed as, for example, a laser texture zone that includes laser textured bumps (roughened surface) that can reduce stiction of the head 20 when resting thereon.

When a loss of power to the disk drive 10 is sensed and/or when the disk drive 10 is commanded to a low-power idle state, the servo controller 53 commands the actuator motor 28 to move the actuator arm assembly 18 so that the head 20 is positioned over the CSS zone 110 where it can be latched by a latch mechanism to prevent the head 20 from leaving the CSS zone 110 and contacting the data portion of the disk 12 as the disk 12 spins down to rest.

While the disk 12 is being spun-down and/or spun-up, the servo controller 53 is configured to move the head 20 radially across the CSS zone 110 so that the head 20 contacts the CSS zone 10 across a wider area of the CSS zone 110 then would otherwise occur if such control is not carried out during spin-down and/or spin-up of the disk 12. Various operations that may be carried out by the servo controller 53 are described below with regard to FIGS. 3-6.

Figure 3:
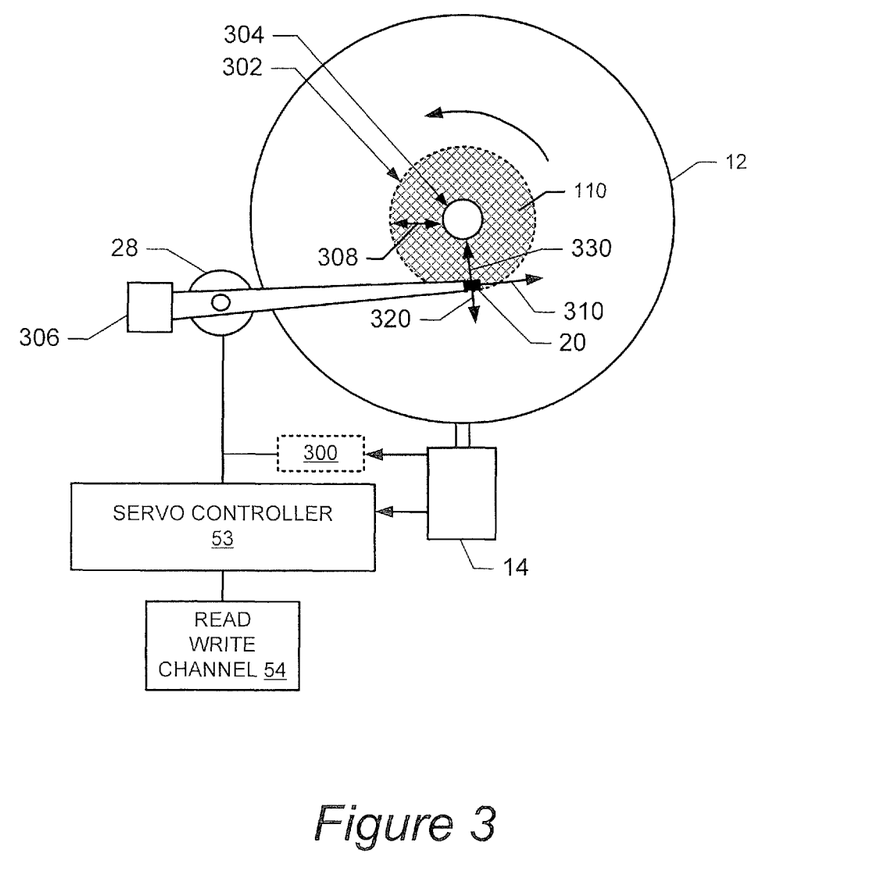
FIG. 3 illustrates a plan view of a disk with a CSS zone and further shows a servo controller and other circuits that move a head radially across the CSS zone during spin-up and/or spin-down of the disk in accordance with some embodiments.

FIG. 3 illustrates a plan view of the disk 12 with the CSS zone 110 and further shows a block diagram of the spin motor 14, the actuator motor 28, and the servo controller 53 that moves the head 20 radially across the CSS zone 110 during spin-up and/or spin-down of the disk 12 in accordance with some embodiments. The CSS zone 110 is defined between illustrated outer and inner CSS diameter boundary locations 302 and 304.

A latch mechanism 306 engages the actuator arm assembly 18 to latch (retain) the head 20 within the CSS zone 110 while the disk 12 is at rest, spinning up to a threshold operational speed, and/or spinning down to rest. When the disk 12 has reached a threshold operating speed, the latch mechanism 306 may disengage from the actuator arm assembly 18 so that the servo controller 53 can move the head 20 outside the CSS zone 110 to data storage portions of the disk 12. Because of, for example, slop in the latch mechanism 306 and/or flexure of the actuator arm assembly 18, the head may slide back-and-forth radially across the CSS zone 110 while the disk is spinning up/down. Therefore, to avoid undesirable contact between the head 20 and data storage portions of the disk 12, the width 308 (distance between diameter boundary locations 302 and 304) of the CSS zone 110 can be much greater than the width of the head 20. It is to be understood that the relative dimensions of the CSS zone 110 and the head 20 have been exaggerated in FIG. 3 for ease of illustration.

As shown in FIG. 3, while the disk 12 is rotating, the head 20 is subjected to a frictional force vector that has a circumferential component 310 in a direction of disk rotation and an outward radial component 320 in a direction toward the outer diameter 302 of the CSS zone 110.

The servo controller 53 is configured to control the actuator motor 28 to move the head 20 radially across the CSS zone 110 while the disk 12 spins-up toward operational speed and/or spins-down to rest. To cause the head 20 to follow a different radial path along the CSS zone 110 during disk spin-up than is followed during disk spin-down, in some embodiments the servo controller 53 responds to disk spin-up by supplying a sufficient actuator current to the actuator motor 28 to counteract the radial frictional force component 320 with a bias force component 330 that moves the head 20 to the inner diameter location 304 of the CSS zone 110 and maintains the head 20 located there during spin-up and/or spin-down of the disk 12. During disk spin-down, the servo controller 53 may be powered-off and/or may not otherwise be operated to move the head 20 toward the inner diameter location 304 (e.g., no bias force component 330) so that the head 20 can instead move toward the outer diameter 302 responsive to the outward radial frictional component 320. Consequently, the head 20 follows a path along the inner diameter 304 during disk spin-up and follows a different path along the outer diameter 302 during disk spin-down, which spreads-out the head-to-disk wear along a greater surface area of the CSS zone 110.

Figure 4:
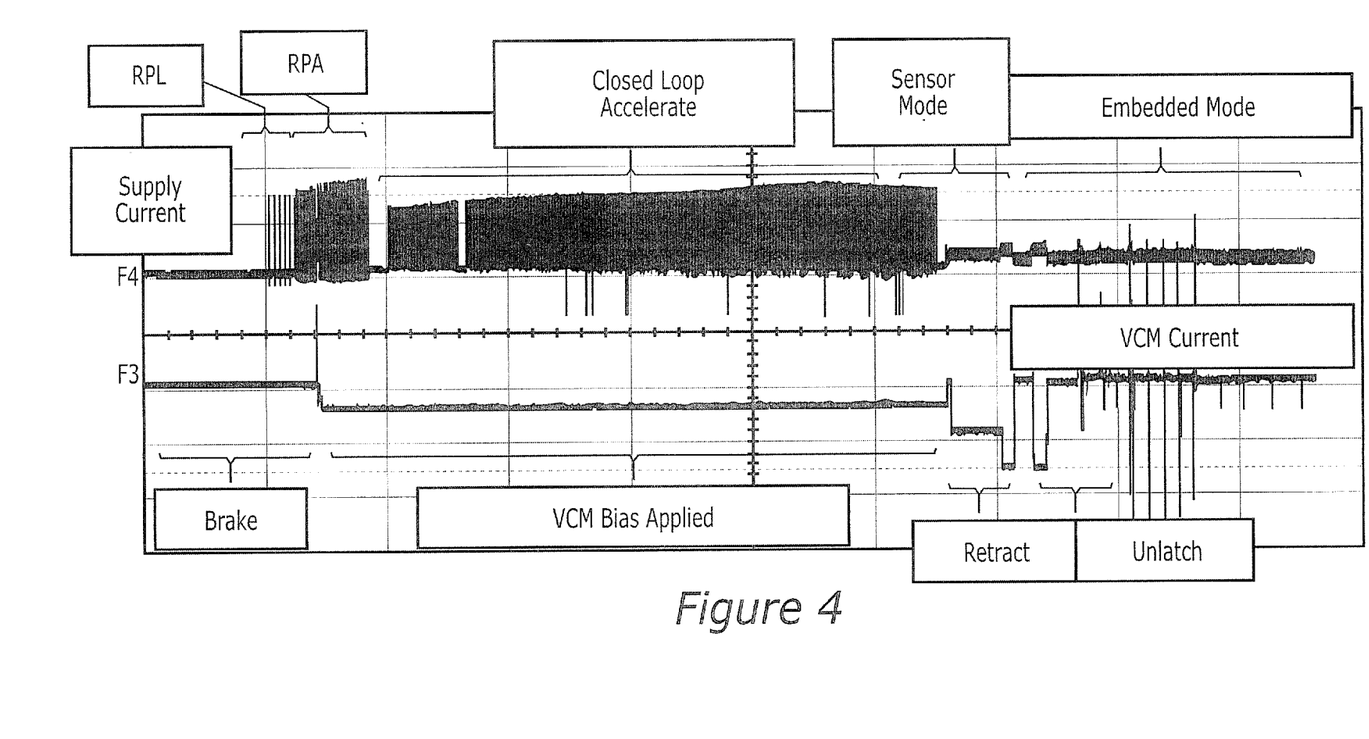
FIG. 4 illustrates a graph of current that is supplied to a spin motor to spin-up a disk and a graph of current that is supplied to a voice coil motor (actuator motor) to radially position the head during spin-up of the disk in accordance with some embodiments.

FIG. 4 illustrates an exemplary graph of current ("Supply Current") that is supplied to a spin motor (such as the spin motor 14) to spin-up a disk, and an exemplary graph of current ("VCM Current") that is supplied to a Voice Coil Motor (such as the actuator motor 28) to radially position the head during spin-up of the disk in accordance with some embodiments. Referring to FIG. 4, a controller controls the spin motor current (Supply Current) to energize alternating phases of the spin motor and to locate therefrom an angular position of the hub by detecting variation in the spin motor's inductance during a Rotor Position Locate "RPL" operational phase. The controller then controls the direction of rotation of the spin motor during a Rotor Position Accelerate "RPA" operational phase by generating the spin motor current (Supply Current) across the correct phases of the spin motor to cause rotation of the rotor and disk in a desired direction. The disk is accelerated during a Closed Loop Accelerate operational phase to spin-up the disk to a desired operational speed, which is sensed during the "Sensor Mode" operational phase. During the RPA and the Closed Loop Accelerate operational phases, the controller controls the VCM Current to apply a defined "VCM Bias" to the VCM so that the head is biased against the inner diameter region of the CSS zone.

Upon reaching the operational speed, a "Retract" VCM Current level is supplied to the VCM to facilitate unlatching of the head. The spin motor current (Supply Current) and the VCM Current are then controlled to provide a desired disk rotational speed and to seek the head to desired tracks to read/write data during an "Embedded Mode" operational phase.

Figure 5:
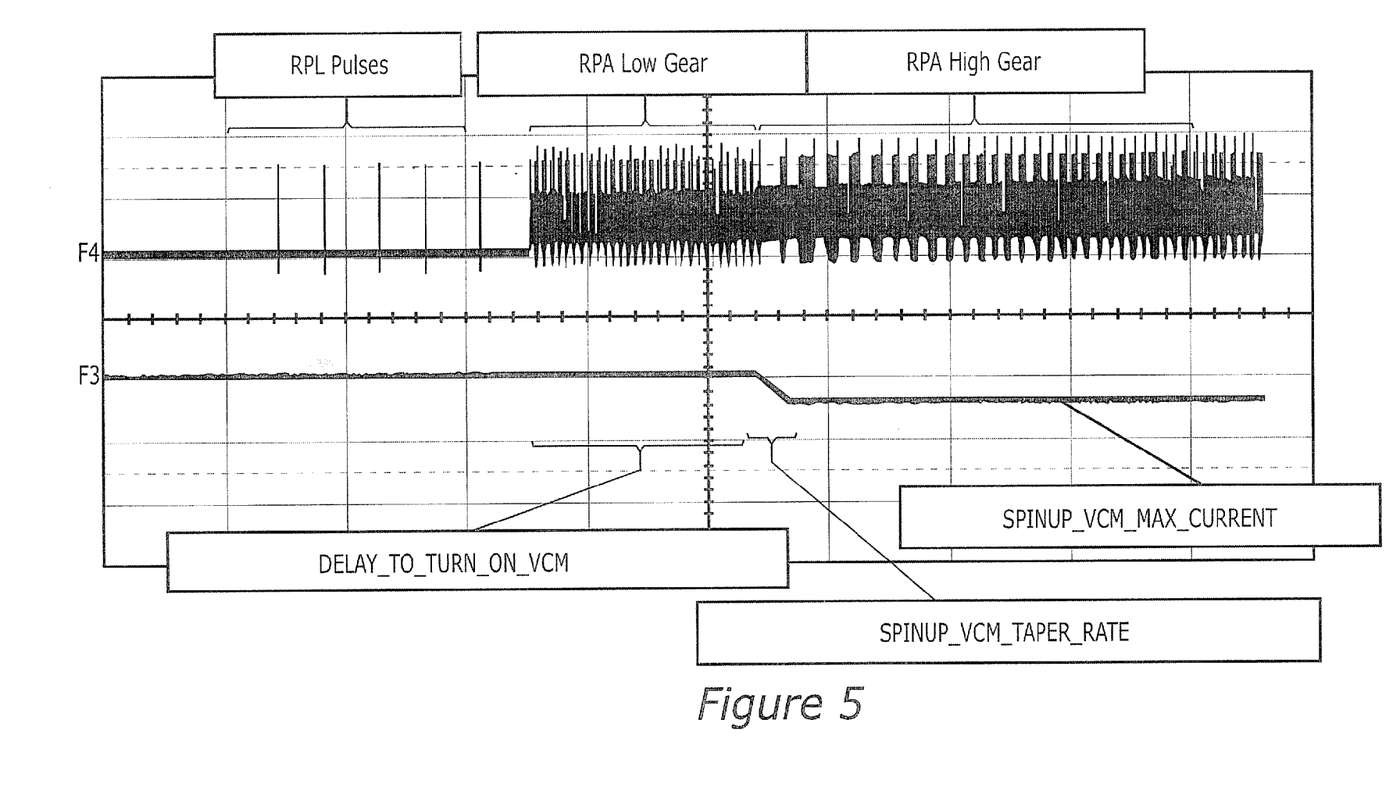
FIG. 5 illustrates in further detail a portion of the graphs of FIG. 4 during disk spin-up in accordance with some embodiments.

FIG. 5 illustrates in further detail a portion of the graphs of FIG. 4 during disk spin-up in accordance with some embodiment. Referring to FIG. 5, the controller can control the spin motor current to provides pulses during a portion of the RPL operational phase ("RPA Low Gear") that enable it to identify an angular position of the rotor and disk. The controller then supplies a higher current to selected phases of the spin motor during a subsequent portion of the RPL operational phase ("RPA High Gear") to cause the spin motor to rotate in a desired direction. At the start of the RPA High Gear operational phase, the controller can ramp the VCM current toward a maximum current level ("Spinup_VCM_Max_Current") to cause the head to move to the inner diameter region of the CSS zone and remain there during spin-up on the disk.

The servo controller 53 may control the actuator motor 28 to repetitively and alternately move the head 20 in opposite radial directions toward the outer and inner CSS diameter locations 302 and 304 on the disk during spin-up and/or spin-down of the disk 12. In some embodiments, the servo controller 53 toggles the actuator motor current between at least two different levels to cause the head 20 to move toward the inner CSS diameter location 304 while the actuator current is at the higher level and then move toward the outer CSS diameter location 302 while the actuator current is at the lower level due to frictional force on the head 20 as the disk spins and/or by supplying a reverse polarity actuator current. The servo controller 53 can thereby cause the head 20 to dither between two or more locations on the CSS zone 110.

For example, the servo controller 53 may increase the actuator motor current to a sufficient level that moves the head 20 to the inner diameter 304, and may then regulate an on-off duty cycle of the actuator motor current to cause the head 20 to dither away from and toward the inner diameter location while the disk 12 spins-up and/or spin-down. The servo controller 53 may ramp the actuator motor current between a defined "on" current level and an "off" (e.g., 0) level to cause the head 20 to sweep back and forth across the CSS zone 110 at a speed that provides a desired distribution of head-to-disk wear across the CSS zone 110. The defined "on" current level and/or the on-off duty cycle of the actuator motor current can be controlled to provide a desired radial range of back-and-forth movement across the CSS zone 110, such as between the inner and outer boundaries 304 and 302 of the CSS zone 110, or between the inner boundary 304 and about a radial midpoint of the CSS zone 110 during disk spin-up and between the outer boundary 302 and about a radial mid-point of the CSS zone 110 during disk spin-down.

Figure 6:
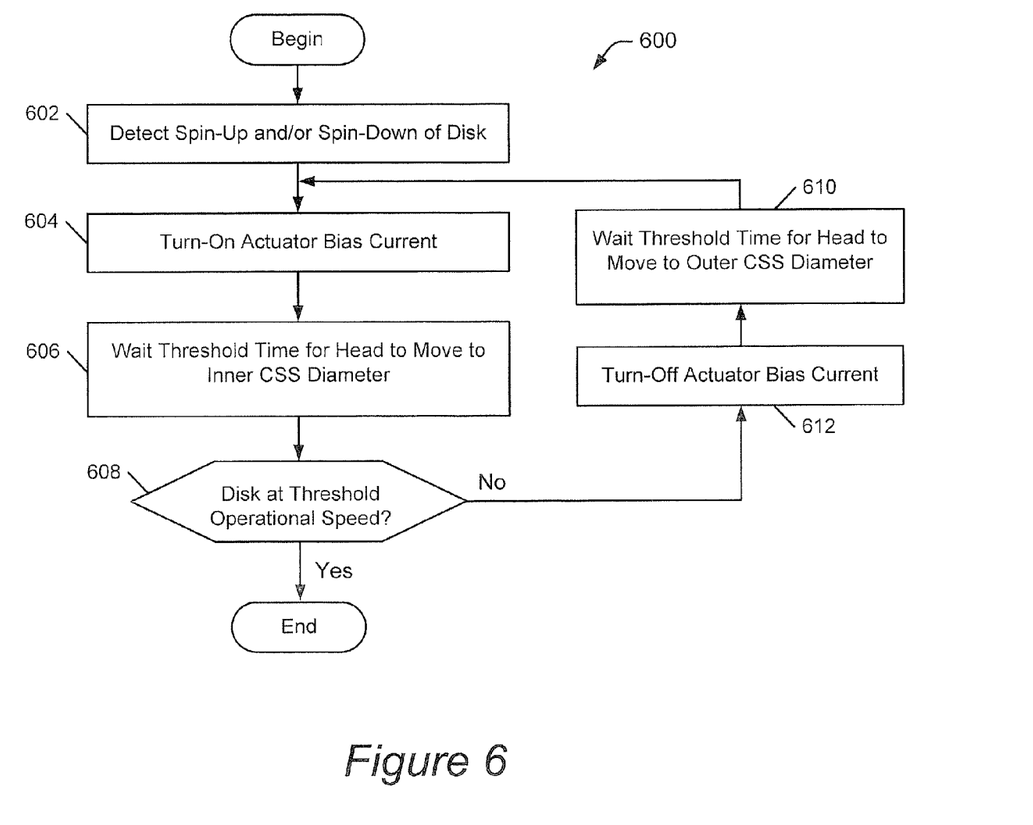
FIG. 6 illustrates a flowchart of operations that may be carried out by the servo controller of FIGS. 2 and 3 to radially position a head over a CSS zone during spin-up and/or spin-down of a disk in accordance with some embodiments.

FIG. 6 is a flowchart that illustrates a non-limiting exemplary embodiment of operations that may be used be carried out by the servo controller 53 of FIGS. 2 and 3 to cause the head 20 to dither between two or more locations on the CSS zone 110 during spin-up and/or spin-down of the disk 12. Referring to FIG. 6, the controller 53 responds (block 602) to detection of spin-up and/or spin-down of the disk 12 by turning-on (block 604), e.g., increasing, the actuator current to move the head 20 toward an inner diameter region of the CSS zone 110. The controller 53 waits (block 606) a threshold time for the head 20 to move to the inner diameter region of the CSS zone 110 and, if the disk 12 has not yet reached a threshold operational speed (block 608), the controller turns-off (block 612), e.g., decreases, the actuator bias current so that the head 20 moves back toward the outer diameter region of the CSS zone 110 in response to frictional forces on the head 20 as the disk 12 spins. The controller 53 waits (block 610) a threshold time for the head 20 to move to the outer diameter region of the CSS zone 110 and then repeats blocks 604-608. In this manner, the head 20 can be repetitively dithered between two or more locations on the CSS zone 110 during spin-up and/or spin-down of the disk 12.

The servo controller 53 may incrementally step between the two different actuator motor current levels to cause the head 20 to be incrementally moved across the CSS zone while the disk is being spun-up from rest and/or spun-down to rest. For example, the CSS zone 110 may have a width of 300 μm when the head has a width of 30 μm. In response to the disk 12 being spun-up and/or spun-down, the servo controller 53 may step the disk through ten different substantially-nonoverlapping circumferential paths (e.g., 300 μm/30 μm=10) along the CSS zone 110 to distribute the frictional head-to-disk wear more evenly across the CSS zone 110. The speed at which the servo controller 53 changes the actuator motor current level can be controlled to regulate the distribution of the head-to-disk wear across the CSS zone 110.

Although the CSS zone 110 typically would not have not have servo information that defines tracks, the servo controller 53 may be calibrated to use a known range of actuator motor current levels that provide an expected radial movement of the head 20 across the CSS zone 110. The CSS zone 110 may include some servo data and/or other circumferential data patterns that can be read by the head 20 to sense rotational angles as the disk 12. The readback signal from the head 20 may be used by the servo controller 53 to count disk revolutions as head 20 is positioned across the CSS zone 110. The servo controller 53 may thereby change the actuator motor current level responsive to the readback signal to provide a desired distribution of head-to-disk wear across the CSS zone 110.

When the disk drive 10 is abruptly powered off, the servo controller 53 may have sufficient time to park the head over the CSS zone 110 and engage the latching mechanism 306 before losing power, but it may not have sufficient power thereafter to continue to regulate positioning of the head 20 over the CSS zone 110 so as to control distribution of the head-to-disk wear. In accordance with some embodiments, the servo controller 53 may be connected to be operationally powered by the spin motor 14 (e.g., as shown in FIG. 3) during at least a portion of time while the disk spins-down to rest (e.g., with the spin motor 14 converting kinetic energy from the spinning disk 12 into electrical power for the servo controller 53). Alternatively or additionally, the disk drive 10 may include a rechargeable power device that can provide a temporary source of power for use in powering the servo controller 53 for a sufficient length of time to enable continued control of head positioning over the CSS zone 110 to provide desired distribution of the head-to-disk wear.

In some embodiments, various functionality described herein as being carried out by the servo controller 53 for controlling positioning of the head 20 over the CSS zone 110 to regulate distribution of the head-to-disk wear may additionally or alternatively be carried out by a separate control circuit 300 (FIG. 3). Because the control circuit 300 can be configured to carry out the limited functionality of regulating distribution of the head-to-disk wear across the CSS zone 110, it may include substantially less circuitry than the servo controller 53. The control circuit 300 may therefore consume substantially less power than the servo controller 53 and may, accordingly, be able to be powered by the spin motor 14 and/or a rechargeable power device for substantially more time while the disk 12 is being spun-down than may otherwise be possible for the servo controller 53.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. Circuitry comprising:
a controller circuit configured to move a head radially in a first direction along a first path across a data storage disk using an applied actuator current and to allow the head to be moved radially in a second opposite direction and along a second different path without the applied actuator current, wherein both the movement in the first direction and the second direction occur when the head is in contact with a surface of a contact-start-stop (CSS) zone of the disk.

2. The circuitry of claim 1, wherein the applied actuator current is sufficient to counteract a radial frictional force on the head.

3. The circuitry of claim 1, wherein the controller circuit is further configured to allow the head to be moved radially without the constant actuator current during spin-up or spin-down of the data storage disk.

4. The circuitry of claim 1, wherein the controller circuit is further configured to repetitively and alternatively move the head and allow the head to move in opposite radial directions within the CSS zone during spin-up or spin-down of the data storage disk.

5. The circuitry of claim 1, wherein the controller circuit is further configured to allow the head to move without the applied actuator motor current in the second direction within the CCS zone using a radial component of a frictional force between the head and the surface of the CSS zone.

6. The circuitry of claim 1, wherein the CSS zone is defined between inner and outer diameter locations on the data storage disk.

7. A method comprising:
operating a controller circuit to move a head radially in a first direction along a first path across a data storage disk using an applied actuator current and to allow the head to be moved radially in a second opposite direction and along a second different path without the applied actuator current, wherein both the movement in the first direction and the second direction occur when the head is in contact with a surface of a contact-start-stop (CSS) zone of the disk.

8. The method of claim 7, wherein the applied actuator current is sufficient to counteract a radial frictional force on the head.

9. The method of claim 7, wherein the controller circuit allows the head to be moved radially without the constant actuator current during spin-up or spin-down of the data storage disk.

10. The method of claim 7, wherein the controller circuit repetitively and alternatively moves the head and allows the head to move in opposite radial directions within the CSS zone during spin-up or spin-down of the data storage disk.

11. The method of claim 7, wherein the controller circuit allows the head to move without the applied actuator motor current in the second direction within the CCS zone using a radial component of a frictional force between the head and the surface of the CSS zone.

12. The method of claim 7, wherein the CSS zone is defined between inner and outer diameter locations on the data storage disk.

13. Circuitry comprising:
a controller circuit configured to
    allow a head to move radially in a first direction along a first path across a contact-start-stop (CSS) zone of the data storage disk using a substantially constant actuator current insufficient to counteract a radial frictional force on the head; and
    move the head radially across the CSS zone in a second opposite direction and along a second different path using a substantially constant actuator current sufficient to counteract the radial frictional force on the head, wherein both the movement in the first direction and the second direction occur when the head is in contact with a data storage disk surface.

14. The circuitry of claim 13, wherein the controller circuit is further configured to allow the head to move radially using the substantially constant actuator current insufficient to counteract the radial frictional force on the head during spin-up or spin-down of the data storage disk.

15. The circuitry of claim 13, wherein the controller circuit is further configured to repetitively and alternatively move the head and allow the head to be moved in opposite radial directions within the CSS zone during spin-up or spin-down of the data storage disk.

16. The circuitry of claim 13, wherein the radial frictional force on the head is a radial component of a frictional force between the head and the data storage disk surface.

17. The circuitry of claim 13, wherein the CSS zone is defined between inner and outer diameter locations on the data storage disk.

18. A method comprising:
operating a controller circuit to allow a head to move radially across a contact-start-stop (CSS) zone in a first direction along a first path of the data storage disk using a substantially constant actuator current insufficient to counteract a radial frictional force on the head; and
operating the controller circuit to move the head radially across the CSS zone in a second opposite direction and along a second different path of the data storage disk using a substantially constant actuator current sufficient to counteract the radial frictional force on the head, wherein the movement of the head in the first direction and the second direction occurs when the head is in contact with a surface of the data storage disk.

19. The method of claim 18, wherein the controller circuit is further operated to allow the head to move radially using the substantially constant actuator current insufficient to counteract the radial frictional force on the head during spin-up or spin-down of the data storage disk.

20. The method of claim 18, wherein the controller circuit repetitively and alternatively moves the head and allows the head to be moved in opposite radial directions within the CSS zone during spin-up or spin-down of the data storage disk.

21. The method of claim 18, wherein the radial frictional force on the head is a radial component of a frictional force between the head and the data storage disk surface.

22. The method of claim 18, wherein the CSS zone is defined between inner and outer diameter locations on the data storage disk.

* * * * *